United States Patent Office 3,408,409
Patented Oct. 29, 1968

3,408,409
OXIDATION OF AROMATIC HYDROCARBONS TO PHENOLS
Robert Stevenson Coffey and Leonard Andrew Duncanson, Norton-on-Tees, England, assignors to Imperial Chemical Industries, Limited, London, England, a corporation of Great Britain
No Drawing. Filed Aug. 10, 1966, Ser. No. 571,383
Claims priority, application Great Britain, Aug. 18, 1965, 35,365/65
14 Claims. (Cl. 260—621)

ABSTRACT OF THE DISCLOSURE

A process for the production of phenols in which an aromatic hydrocarbon is oxidized in the liquid phase by a gas containing free oxygen in the presence of formic acid and a transition metal catalyst.

---

This invention relates to the production of oxygen-containing organic compounds.

According to the invention there is provided a process for the production of phenols in which an aromatic hydrocarbon is oxidised in the liquid phase by a gas containing free oxygen in the presence of formic acid and a transition metal catalyst.

It is believed that the reaction mechanism involves the oxidation of formic acid to carbon oxides and a transient ionic species which promotes the oxidation of the aromatic hydrocarbon. This ionic species may be adsorbed on a transition metal surface. However, we do not wish to be bound by any theory of reaction mechanism.

Examples of aromatic hydrocarbons which may be oxidised by the process of the invention are benzene, toluene and xylene and the product may accordingly contain phenol, cresols or xylenols. The process of the invention is particularly applicable to the oxidation of benzene to phenol. In the process little or no polyhydroxybenzenes are formed.

The gas containing free oxygen may be air, oxygen or oxygen diluted with a gas which is inert under the conditions of the process, for example, nitrogen.

The transition metal may be ruthenium, rhodium, palladium, osmium, iridium, platinum, titanium, tungsten, vanadium, chromium, manganese, iron, cobalt, nickel and molybdenum. Preferably the transition metal is a noble metal of Group 8 of the Periodic Table, especially iridium or palladium. It is preferred that the transition metal catalyst is freshly precipitated transition metal which may very conveniently be obtained by reducing a transition metal compound with formic acid. However a transition metal compound soluble in the reaction mixture may be employed as the catalyst. If the transition metal is iridium, precipitated iridium may be very conveniently obtained by reducing chloriridic acid with formic acid in solution in for example, acetic acid.

The transition metal may be carried on a suitable support such as silica, alumina or active carbon. It is preferred that the process of the invention is carried out in the presence of a base which does not poison the transition metal catalyst. The base may be an alkali metal, alkaline earth metal or ammonium carboxylate, preferably lithium acetate.

The process of the invention is preferably carried out in the presence of a solvent which is substantially stable under the reaction conditions. While other solvents such as water may be used it is preferred that the solvent is a lower aliphatic carboxylic acid for example, formic or acetic acid, preferably acetic acid. It is further preferred that both a base and a carboxylic acid solvent are employed and it is then very convenient that the base is a salt of the acid used as solvent. A very suitable combination of base and solvent is lithium acetate and acetic acid.

The liquid phase is preferably single phase.

Suitable temperatures for carrying out the process are those at which formic acid is oxidised in the presence of the transition metal catalyst and at which a liquid phase is present. Thus very suitable temperatures are at or near the boiling point of the aromatic compound.

Pressure may be applied to maintain a liquid phase.

The invention is illustrated by the following examples.

Example 1

An iridium catalyst composition was prepared as follows:

37.5 ml. glacial acetic acid, 2 gm. lithium acetate, 15 ml. of a solution of chloriridic acid in 20% aqueous acetic acid (0.5 mole per litre of iridium metal), and 0.5 ml. formic acid were mixed and heated at 100° C. under an atmosphere of nitrogen for 30 minutes. Iridium metal was precipitated.

69 gm. benzene and 7.5 ml. glacial acetic acid were then added to the catalyst composition and the concentration of lithium acetate adjusted to approximately 0.7 mole per litre by adding 5.4 gm. lithium acetate. The reaction flask containing the mixture was then connected to a series of cold traps and, while maintaining the temperature of the mixture at 80° C. and passing oxygen through the mixture at 10 litres per hour, 11.2 ml. per hour of a mixture of equal volumes of formic and acetic acids were gradually added over 15 hours. The total amount of formic acid added was 84 cc. (92.5 gm.) and about 1.6 moles carbon dioxide were evolved. The contents of the flask decreased in weight by 67.4 gm. while 94.2 gm. of material accumulated in the cold traps.

The weight of phenol produced was 2.7 gm. representing a yield on formic acid consumed of 1.5 moles percent. 59 gm. of benzene were recovered unchanged. The amount of benzene consumed was therefore not more than 10 gm. and the yield of phenol on benzene consumed was at least 22.5 moles percent. Diphenyl was present in the product but no polyhydroxybenzenes could be detected.

Example 2

A series of experiments were carried out on the oxidation of benzene using an iridium catalyst to determine the effect of lithium acetate concentration, temperature and rate of formic acid addition on the yield of phenol.

In experiments 1 to 9 inclusive an iridium catalyst composition containing 0.287 gm. iridium was prepared as described in Example 1. In experiments 10 and 11 the catalyst composition was prepared by the same procedure except that the iridium was introduced respectively as precipitated iridium metal (0.172 gm.) instead of chloriridic acid or as a mixture of iridium metal (0.111 gm.) and chloriridic acid (0.058 gm. iridium). In all the experiments except experiment 9, 69 gm. benzene and sufficient lithium acetate to give the concentration indicated in table below were then added to the catalyst composition maintained at a temperature of either 60° C. or 80° C. and 30 ml. of a mixture of 1 part formic acid and 1 or 3 parts glacial acetic acid gradually added over a period of 4 hours while oxygen was passed through the mixture at 10 litres per hour. The temperature was maintained for a further 15 minutes after the addition of formic acid was completed. Experiment 9 was carried out in the same way except that the formic acid was added as 99% formic acid over a period of 8½ hours and the temperature maintained for a further hour after the addition of formic acid was completed.

Further details of the reaction conditions and the results obtained in the experiments are given in the following table:

| Experiment No. | Temperature, °C. | Lithium acetate, moles/litre | Formic acid, moles | | Phenol formed, gm. | Yield phenol on formic acid consumed, moles percent |
|---|---|---|---|---|---|---|
| | | | Added | Unconverted | | |
| 1 | 60 | 0.927 | 0.199 | 0.078 | 0.2 | 1.9 |
| 2 | 80 | 0.927 | 0.199 | 0.016 | 0.6 | 3.4 |
| 3 | 80 | 0.927 | 0.398 | Nil | 0.7 | 1.8 |
| 4 | 60 | 0.25 | 0.199 | 0.046 | 0.3 | 1.7 |
| 5 | 60 | 0.25 | 0.398 | 0.082 | 0.2 | 0.7 |
| 6 | 60 | 0.927 | 0.398 | 0.200 | 0.5 | 1.7 |
| 7 | 80 | 0.25 | 0.398 | 0.025 | 0.6 | 1.6 |
| 8 | 80 | 0.25 | 0.199 | 0.015 | 0.5 | 2.8 |
| 9 | 80 | 0.78 | 1.700 | 0.190 | 1.5 | 1.1 |
| 10 | 80 | 0.927 | 0.398 | 0.021 | 0.3 | 0.8 |
| 11 | 80 | 0.927 | 0.398 | Nil | 0.3 | 0.8 |

Example 3

A solution of rhodium trichloride in ethanol was allowed to stand in contact with excess cyclo-octene until a rhodium compound precipitated. 0.46 gm. of this compound were suspended in methanol and shaken under an atmosphere of hydrogen for 1 hour to precipitate rhodium metal. This precipitate was separated in a centrifuge and washed with methanol, ethanol and finally benzene.

The precipitated rhodium metal was used in the oxidation of benzene as described in Example 2, experiment 10. The temperature was 80° C. and the initial concentration of lithium acetate was 0.9 mole/litre, while of the 0.398 mole formic acid added 0.153 mole remained unchanged. 0.03 gm. of phenol were produced representing a yield of 0.15 mole percent on the formic acid consumed.

Example 4

An experiment was carried out in the same manner as experiment No. 10 of Example 2 except that 3.19 gm. of a 5% palladium on silica catalyst was used instead of precipitated iridium metal.

Of the 0.398 mole formic acid added, 0.144 mole remained unchanged and 1.4 gm. phenol were formed, representing a 7.8 mole percent yield of phenol on formic acid consumed. The yield of phenol on benzene lost from the system was 31 moles percent.

The experiment was repeated in the absence of lithium acetate. 0.14 gm. phenol was formed representing a yield of 1.3 moles percent on formic acid consumed.

The experiment was also repeated in the absence of a palladium catalyst. No phenol could be detected in the product.

Example 5

3 ml. of an aqueous acetic acid solution of chloriridic acid containing 0.144 gm. iridium was added to a solution of 4.95 gm. lithium acetate and 1 ml. of formic acid in 70 ml. glacial acetic acid and 60 ml. toluene. The mixture was heated at 80° C. under an atmosphere of nitrogen for 90 minutes to precipitate iridium metal. While maintaining the temperature of the mixture at 80° C. oxygen was passed through the stirred mixture at 10 litres per hour while 7.92 gm. formic acid were added dropwise over a period of 3¼ hours. The reaction product was shown to contain cresol by ultraviolet spectroscopy.

We claim:
1. A process for the production of phenols which comprises oxidizing an aromatic hydrocarbon selected from the group consisting of benzene, toluene and xylene in the liquid phase by contacting said hydrocarbon in a liquid solvent with a gas containing free oxygen in the presence of formic acid, a transition metal catalyst and a base selected from the group consisting of alkali metal, alkaline earth metal and ammonium carboxylates, the temperature being in the range of 60° C. to the boiling point of the hydrocarbon.

2. A process as claimed in claim 1 in which the transition metal catalyst is freshly precipitated transition metal.

3. A process as claimed in claim 2 in which the freshly precipitated transition metal is produced by reducing a transition metal compound with formic acid.

4. A process as claimed in claim 1 in which the transition metal is a noble metal of Group 8 of the Periodic Table.

5. A process as claimed in claim 4 in which the Group 8 metal is iridium.

6. A process as claimed in claim 4 in which the Group 8 metal is palladium.

7. A process as claimed in claim 1 in which the transition metal is carried on a support.

8. A process as claimed in claim 1 in which the carboxylate is lithium acetate.

9. A process as claimed in claim 1 in which the solvent is a lower aliphatic carboxylic acid.

10. A process as claimed in claim 9 in which the lower aliphatic carboxylic acid is acetic acid.

11. A process as claimed in claim 1 in which the aromatic hydrocarbon is benzene.

12. A process as claimed in claim 11 in which the transition metal catalyst is freshly precipitated metal and the solvent is a lower carboxylic acid.

13. A process as claimed in claim 12 in which the lower carboxylic acid is acetic acid.

14. A process as claimed in claim 13 in which the base is lithium acetate.

References Cited

UNITED STATES PATENTS 3,033,903   5/1962   Loeb _____ 260—621

LEON ZITVER, *Primary Examiner.*

H. ROBERTS, *Assistant Examiner.*